US012781678B2

(12) United States Patent
Matsumoto et al.

(10) Patent No.: US 12,781,678 B2
(45) Date of Patent: Nov. 3, 2026

(54) ENGINE CONTROLLER

(71) Applicant: SUBARU CORPORATION, Tokyo (JP)

(72) Inventors: Koki Matsumoto, Tokyo (JP); Tatsuya Suto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 19/190,883

(22) Filed: Apr. 28, 2025

(65) Prior Publication Data

US 2025/0361842 A1 Nov. 27, 2025

(30) Foreign Application Priority Data

May 27, 2024 (JP) ................................ 2024-085579

(51) Int. Cl.
*F02D 41/04* (2006.01)
*F02N 11/08* (2006.01)

(52) U.S. Cl.
CPC ........ *F02D 41/042* (2013.01); *F02N 11/0814* (2013.01); *F02D 2200/50* (2013.01); *F02D 2200/60* (2013.01)

(58) Field of Classification Search
CPC ............... F02D 41/042; F02D 2200/50; F02D 2200/60; F02N 11/0814
See application file for complete search history.

(56) References Cited

U.S. PATENT DOCUMENTS

2002/0033157 A1* 3/2002 Thompson .......... F02N 11/0803 123/198 DB
2012/0316740 A1* 12/2012 Funakoshi .......... F02D 41/0225 701/54
2016/0052510 A1* 2/2016 Aldrich, III .... B60W 30/18063 180/65.265
2018/0237016 A1* 8/2018 Khafagy .................. B61H 1/00
2019/0301418 A1* 10/2019 Khafagy ............... F02D 41/042
2019/0389477 A1 12/2019 Balakrishna et al.
2020/0200111 A1* 6/2020 Buis ........................ F02D 41/22

FOREIGN PATENT DOCUMENTS

JP 2011-94494 A 5/2011
JP 2020-29860 A 2/2020

* cited by examiner

*Primary Examiner* — George C Jin
(74) *Attorney, Agent, or Firm* — Rimon P.C.

(57) ABSTRACT

An engine controller is configured to control an engine of a vehicle, and includes one or more processors configured to, when a predetermined condition is established, perform an automatic stop mode including stopping operation of the engine. The one or more processors are configured to, in the automatic stop mode, make measurement of time duration devoid of any driving operations detected with respect to the vehicle while the engine is in operation. The one or more processors are configured to, when the time duration becomes longer than first time, make it selectable whether to continue or stop the operation of the engine.

8 Claims, 2 Drawing Sheets

ENGINE CONTROLLER

CROSS-REFERENCE TO RELATED APPLICATIONS

The present application claims priority from Japanese Patent Application No. 2024-085579 filed on May 27, 2024, the entire contents of which are hereby incorporated by reference.

BACKGROUND

The disclosure relates to an engine controller configured to control an engine of a vehicle.

When a vehicle is idling, i.e., parked and stopped with its engine in operation, there are not only environmental issues such as air pollution caused by an exhaust gas but also the following issues. For example, when the engine is kept idling because a driver stops the vehicle and gets off the vehicle, with the engine in operation, even a third party who does not have a vehicle key can start the vehicle. This may possibly result in vehicle theft. Moreover, when the idling vehicle is located in, for example, an environment lacking sufficient ventilation, e.g., a garage or a space enclosed in the snow, there is possibility of carbon monoxide poisoning of an occupant of the vehicle.

In view of these issues, proposals have been made for various techniques of automatically stopping the engine when the engine is kept idling for a predetermined time or longer. For example, reference is made to Japanese Unexamined Patent Application Publication (JP-A) Nos. 2011-94494 and 2020-29860.

SUMMARY

An aspect of the disclosure provides an engine controller configured to control an engine of a vehicle. The engine controller includes one or more processors configured to, when a predetermined condition is established, perform an automatic stop mode including stopping operation of the engine. The one or more processors are configured to, in the automatic stop mode, make measurement of time duration devoid of any driving operations detected with respect to the vehicle while the engine is in operation. The one or more processors are configured to, when the time duration becomes longer than first time, make it selectable whether to continue or stop the operation of the engine.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
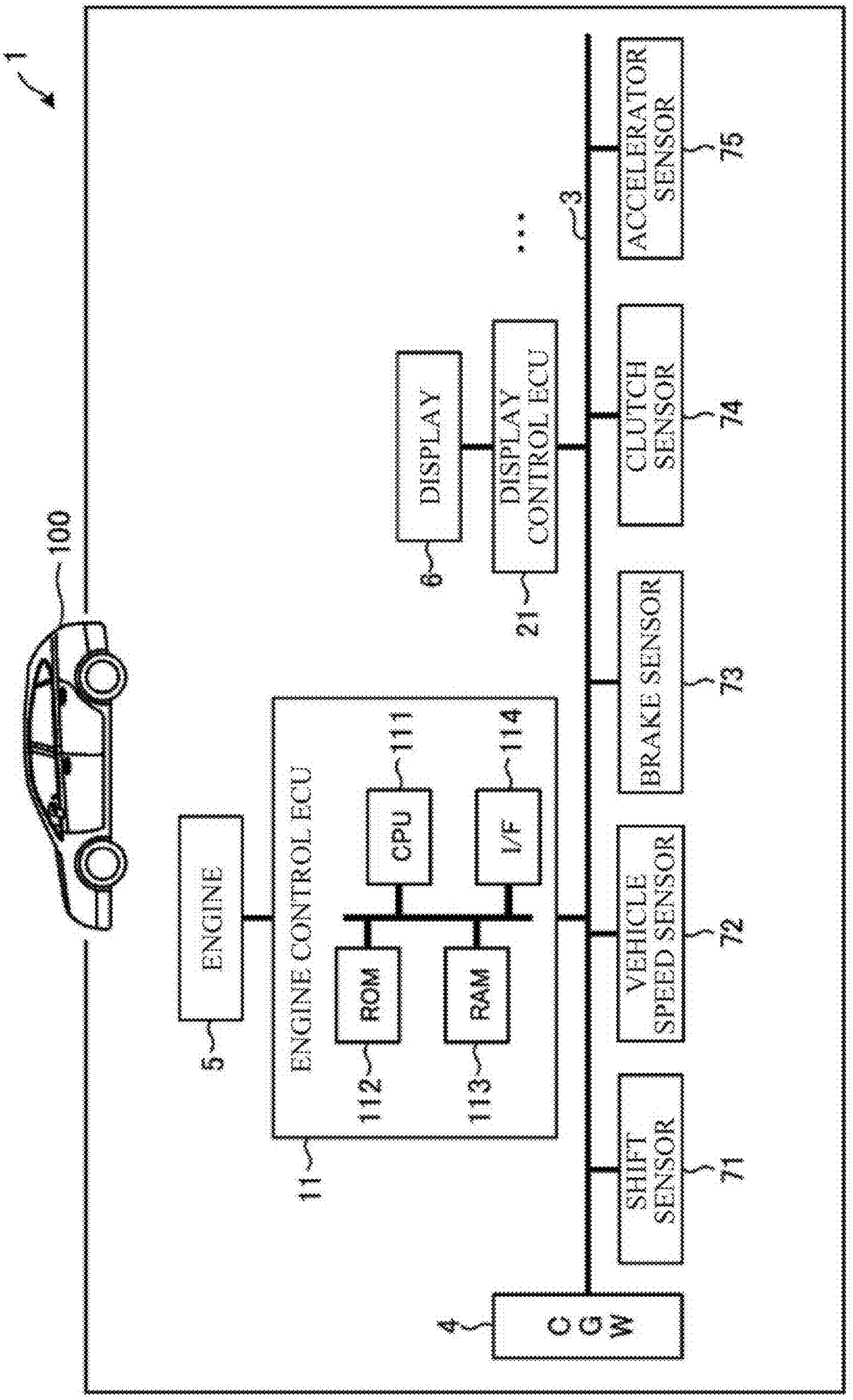
FIG. 1 is a block diagram of a schematic configuration of an engine controller according to an embodiment of the disclosure.

To suppress vehicle theft, carbon monoxide poisoning, etc., it is preferable to automatically stop the engine when the engine is kept idling for a predetermined time or longer. On the other hand, in some cases, stopping the engine may be undesirable.

For example, when an occupant spends a winter night in a vehicle in the open air where sufficient ventilation is available, automatically stopping the engine also causes a stop of heating in the vehicle interior. This significantly lowers convenience and comfort of the occupant. Moreover, in extremely cold regions, once the engine is stopped, the engine may freeze and cannot be restarted afterwards. This also significantly lowers the convenience and the comfort of the occupant.

It is desirable to provide an engine controller that makes it possible to suppress vehicle theft and carbon monoxide poisoning of an occupant while providing convenience and comfort of the occupant.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

As illustrated in FIG. 1, an engine controller according to an embodiment may serve as a part of a vehicle control system 1 to be mounted on a vehicle 100 and is configured to control an engine 5 of the vehicle 100.

The vehicle control system 1 may include a plurality of sensors, various electronic devices for travel of the vehicle 100, and a plurality of electronic control units (ECUs). The sensors are configured to acquire various kinds of data indicating a travel state of the vehicle 100 and an environment inside and outside the vehicle. The ECUs are configured to control the sensors and the electronic devices. With such a configuration, the vehicle control system 1 is configured to make various controls to provide and maintain safe travel of the vehicle 100, and convenience and comfort of an occupant.

The sensors, the electronic devices, and the ECUs are communicatably coupled together by an in-vehicle network 3 such as a CAN (Controller Area Network) or a LIN (Local Interconnect Network), and a central gateway (CGW) 4 as a relay device. It is to be noted that the vehicle control system 1 illustrated in FIG. 1 is merely an example, and may have a configuration devoid of the CGW 4 in which the ECUs communicate with one another directly or indirectly.

In the vehicle control system 1, the data acquired by each sensor may be outputted to the in-vehicle network 3, while data indicating operation states of the electronic devices to be controlled may be outputted from each ECU to the in-vehicle network 3. In the following, the electronic devices to be controlled are referred to as control target devices. Moreover, each ECU may control operation of the control target devices based on the data from each sensor and the other ECUs acquired from the in-vehicle network 3.

Each ECU may include, for example, a processor such as a CPU (Central Processing Unit) or an MPU (Micro Processing Unit), and is configured to perform various kinds of processing by the processor. Each ECU may further include a volatile storage element such as a RAM (Random Access Memory) configured to temporarily process data to be used by the processor, and a non-volatile storage element such as a ROM (Read Only Memory) configured to hold, for example, programs to be executed by the processor.

FIG. 1 illustrates an engine control ECU 11 and a display control ECU 21 out of the ECUs, and illustration of the other ECUs is omitted. In one embodiment of the disclosure, the engine control ECU 11 may serve as an "engine controller." The display control ECU 21 is configured to control a display 6 provided in the vehicle interior of the vehicle 100.

Moreover, FIG. 1 illustrates a shift sensor 71, a vehicle speed sensor 72, a brake sensor 73, a clutch sensor 74, and an accelerator sensor 75 out of the sensors, and illustration of the other sensors and devices is omitted. The shift sensor 71 may detect a position of an unillustrated shift lever of the vehicle 100. The vehicle speed sensor 72 may detect a vehicle speed of the vehicle 100. The brake sensor 73 may detect an operation on an unillustrated brake. The clutch sensor 74 may detect an operation on an unillustrated clutch. The accelerator sensor 75 may detect an operation on an unillustrated accelerator.

In the following description, detailed description and illustration of the ECUs, the sensors, and the electronic devices that are included in the vehicle control system 1 but are not involved in the operation of the engine control ECU 11 are omitted.

In the following, the engine control ECU 11 and the display control ECU 21 illustrated in FIG. 1 are described.

The engine control ECU 11 may be coupled to the engine 5 as an internal combustion engine configured to drive the vehicle 100. The engine control ECU 11 is configured to control the engine 5 based on a driving operation with respect to the vehicle 100, such as an operation on the accelerator detected by the accelerator sensor 75. The engine control ECU 11 is configured to, when a predetermined condition described later is established, perform an automatic stop mode including stopping the operation of the engine 5.

As illustrated in FIG. 1, the engine control ECU 11 may include a CPU 111, a ROM 112, a RAM 113 and an I/F 114, and control the engine 5 by the CPU 111 performing various kinds of processing based on programs held in the ROM 112.

The ROM 112 may be provided as a non-volatile storage element. The ROM 112 may hold control programs to control the engine 5 and various kinds of data to be involved in executing the control programs. The control programs may include a program related to the automatic stop mode. The various kinds of data may include first time and second time as threshold values set for time duration described later.

The RAM 113 may be provided as a volatile storage element. The RAM 113 may serve as a working area when the CPU 111 performs the various kinds of processing. Accordingly, the RAM 113 is configured to temporarily hold, on an as-needed basis, the various kinds of data outputted from the ECUs and the sensors on the in-vehicle network 3.

The CPU 111 may control the engine 5 by reading the program held in the ROM 112 into a memory such as the RAM 113 and execute the program.

The I/F 114 may control input and output of the various kinds of data and control signals to be used in the engine control ECU 11. That is, the I/F 114 may accept input of the various kinds of data outputted from the ECUs and the sensors of the vehicle control system 1 to the in-vehicle network 3, and output the control signals generated in the CPU 111 to an output destination corresponding to contents of controls.

The display control ECU 21 may be coupled to the display 6. The display control ECU 21 is configured to control contents of display on the display 6.

For example, the display 6 may include a touchscreen display configured to display various kinds of information and allow for an input operation. When the display 6 includes the touchscreen display, the display 6 may serve as a user interface configured to present various kinds of information to the occupant of the vehicle 100 and accept input of an instruction by the occupant. It is to be noted that the display 6 may also include an HUD (Head-Up Display) or a CID (Center Information Display). In this case, the display 6 may exclusively present the various kinds of information to the occupant, and the input of the instruction by the occupant may be accepted by an unillustrated user interface provided separately from the display 6.

Although not illustrated, as with the engine control ECU 11, the display control ECU 21 may also include a CPU, a ROM, a RAM and an I/F, and control the display 6 by the CPU performing various kinds of processing based on programs held in the ROM.

Next, the control of the engine 5 in the engine control ECU 11 is described. The engine control ECU 11 is configured to, when the predetermined condition described below is established, selectively perform the automatic stop mode including stopping the operation of the engine 5. Whether to turn ON or OFF the automatic stop mode, i.e., whether to perform the automatic stop mode, may be appropriately set by the occupant of the vehicle 100.

Alternatively, default setting may be provided in which the automatic stop mode is turned ON or OFF. In this case, the occupant may change the setting to turn ON or OFF the automatic stop mode on an as-needed basis. For example, in a case where the default setting is provided in which the automatic stop mode is turned ON, even when the occupant gets on the vehicle and changes the setting to turn OFF the automatic stop mode, the default setting may be restored in which the automatic stop mode is turned ON when a power supply of the vehicle 100 is switched OFF.

It is to be noted that, when the vehicle 100 is fed with electric power from an external emergency power supply, the engine control ECU 11 may determine that electric power is supplied by the external power supply, and turn OFF the automatic stop mode.

When the setting is provided in which the automatic stop mode is turned ON, the engine control ECU 11 may control the engine 5 as follows.

When a condition for a start of the automatic stop mode is established, the engine control ECU 11 may operate an unillustrated timer. The timer may make measurement of the time duration in which idling continues in the vehicle 100. The time duration means duration of time devoid of any driving operations detected while the vehicle 100 is parked and stopped, and the engine 5 is in operation.

In the engine control ECU 11, the condition for the start of the operation of the automatic stop mode may be determined as appropriate. In one example, the automatic stop mode may be started at the same time as a start of the idling of the vehicle 100. For example, the condition for the start of the operation of the automatic stop mode may include the following three conditions: (1) the shift lever is in a P range;

(2) the vehicle speed of the vehicle 100 is less than a certain speed; and (3) no driving operations have been made, e.g., no brake operations have been made, and no clutch operations have been made.

It is to be noted that, because FIG. 1 illustrates an example in which the vehicle 100 includes the clutch sensor 74, the condition for the start of the operation of the automatic stop mode includes that no clutch operations have been made. Accordingly, for the vehicle 100 devoid of the clutch pedal and the clutch sensor 74, the condition for the start of the operation of the automatic stop mode does not have to include the condition related to the clutch operations.

The engine control ECU 11 is configured to, when the time duration measured by the timer becomes longer than the predetermined first time, make it selectable whether to continue or stop the operation of the engine 5. At this occasion, the engine control ECU 11 may give the occupant of the vehicle 100 a notification about elapse of the first time and an automatic stop of the engine 5 after elapse of the second time, for example, by displaying the notification on the display 6. In addition, the engine control ECU 11 may accept an input of an instruction to continue the operation of the engine 5 or an instruction to stop the operation of the engine 5, until the elapse of the second time since the notification.

On the occasion of the display on the display 6, the engine control ECU 11 may output a buzzer, i.e., an alarm sound, a predetermined sound, etc. by an unillustrated speaker provided in the vehicle 100. This makes it possible to give the notification about the automatic stop of the engine 5 to, for example, the occupant in a nap, and prompt the occupant to input the instruction to continue the operation of the engine 5 or the instruction to stop the operation of the engine 5.

Here, the first time and the second time may be determined in advance, and may be held in, for example, the ROM 112. The first time may range, for example, from about 15 minutes to about 60 minutes depending on the season, the regions, the vehicle types, etc. Similarly, the second time may range, for example, from several tens of seconds to several minutes depending on the season, the regions, the vehicle types, etc.

The input of the instruction to continue the operation of the engine 5 or the instruction to stop the operation of the engine 5 may be made on, for example, the unillustrated user interface provided in the vehicle 100. When the display 6 includes the touchscreen display, an input screen may be displayed on the display 6. The input screen is configured to allows for the input of the instruction to continue the operation of the engine 5 or the instruction to stop the operation of the engine 5. This makes it possible to accept the input by the display 6. The engine control ECU 11 may control the engine 5 in accordance with the inputted instruction to continue the operation of the engine 5 or the instruction to stop the operation of the engine 5.

In one example, the engine control ECU 11 may continue the operation of the engine 5 when the instruction to continue the operation of the engine 5 is inputted. At this occasion, the engine control ECU 11 may stop the timer, reset the time duration measured, and restart the measurement of the time duration. Alternatively, when the instruction to continue the operation of the engine 5 is inputted, the engine control ECU 11 may stop the timer to continue the operation of the engine 5 and may turn OFF the automatic stop mode. In this case, the operation of the engine 5 may be continued until the power supply of the vehicle 100 is switched OFF or a stop operation is inputted. Afterwards, when the power supply of the vehicle 100 is switched ON again, the automatic stop mode may be also turned ON.

Moreover, when the instruction to stop the operation of the engine 5 is inputted, or when the instruction to continue the operation of the engine 5 and the instruction to stop the operation of the engine 5 are uninputted, the engine control ECU 11 may stop the operation of the engine 5 after the lapse of the second time since the notification.

When the setting is provided in which the automatic stop mode is turned OFF, the engine control ECU 11 may refrain from operating the unillustrated timer and making the measurement even when the condition for the start of the operation of the automatic stop mode is established. That is, when the setting is provided in which the automatic stop mode is turned OFF, the engine control ECU 11 may refrain from stopping the operation of the engine 5 even when no driving operations are detected while the vehicle 100 is parked and stopped, and the engine 5 is in operation.

Figure 2:
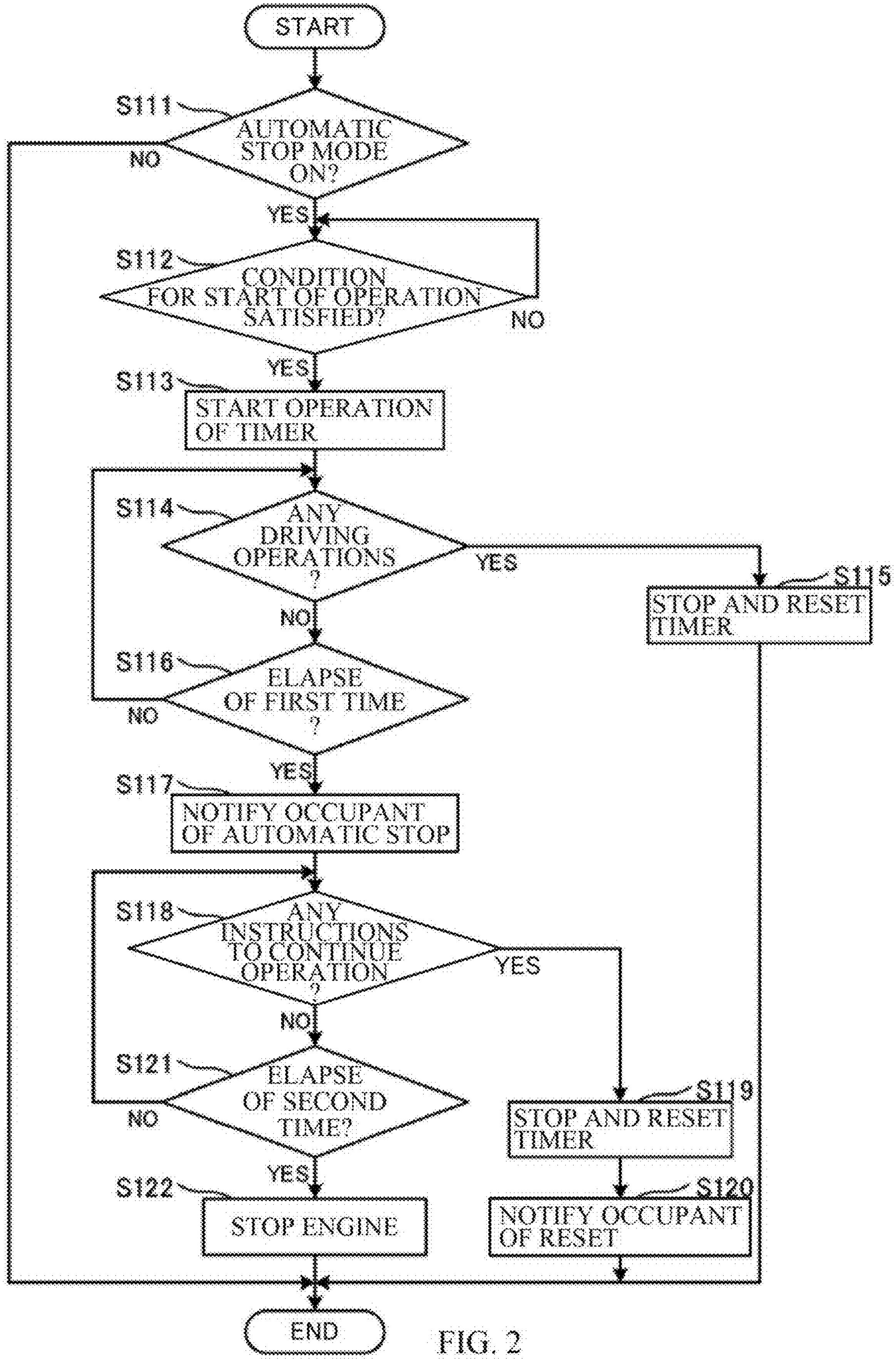
FIG. 2 is a flowchart of an example of control processing in the engine controller according to the embodiment of the disclosure.

Description now moves on to the control of the engine 5 in the engine control ECU 11 having such a configuration, with reference to a flowchart in FIG. 2. A series of processes from "START" to "END" in the flowchart in FIG. 2 may be repeated on predetermined cycles, or at predetermined time intervals, while the automatic stop mode is turned ON and the vehicle 100 is kept idling.

When the setting is provided in which the automatic stop mode is turned ON (YES in step S111), the engine control ECU 11 may check whether the condition for the start of the operation of the automatic stop mode is established (step S112). When the condition for the start of the operation is established (YES in step S112), the engine control ECU 11 may start the operation of the timer (step S113), and monitor presence or absence of any driving operations with respect to the vehicle 100 (step S114).

When any driving operations with respect to the vehicle 100 are present (YES in step S114), the engine control ECU 11 may stop the timer and reset the time duration measured so far (step S115), and end the processing.

When no driving operations with respect to the vehicle 100 are present (NO in step S114), the engine control ECU 11 may continue to monitor the presence or the absence of any driving operations until the time duration measured by the timer becomes longer than the first time (NO in steps S114 and S116).

When the time duration devoid of any driving operations becomes longer than the first time (YES in step S116), the engine control ECU 11 may give the occupant of the vehicle 100 the notification about the automatic stop of the engine 5 after the elapse of the second time, by, for example, displaying the notification on the display 6 (step S117). At this occasion, the engine control ECU 11 may also make it selectable whether to continue or stop the operation of the engine 5.

In one example, the engine control ECU 11 may accept the input of the instruction to continue the operation of the engine 5 or the instruction to stop the operation of the engine 5 until the elapse of the second time (NO in steps S118 and S121). For example, the engine control ECU 11 may display, on the display 6, the input screen for the input of the instruction to continue the operation of the engine 5 or the instruction to stop the operation of the engine 5, and prompt the occupant to select whether to continue or stop the operation of the engine 5.

When the engine control ECU 11 accepts the input of the instruction to continue the operation of the engine 5 by the occupant until the elapse of the second time since the notification in step S117 (YES in step S118), the engine control ECU 11 may stop the timer and reset the time duration measured so far (step S119), give the occupant of the vehicle 100 the notification about the reset (step S120), and end the processing.

When the engine control ECU 11 accepts the instruction to stop the operation of the engine 5 until the elapse of the second time since the notification in step S117, or when the instruction to continue the operation of the engine 5 and the instruction to stop the operation of the engine 5 are uninputted until the elapse of the second time since the notification in step S117, the engine control ECU 11 may stop the operation of the engine 5 after the lapse of the second time since the notification in step S117 (step S122), and end the processing.

As described, according to the engine controller of the embodiment, when no driving operations with respect to the vehicle 100 are detected for the first time or longer while the engine 5 is in operation, whether to automatically stop the engine 5 in operation is made selectable. This makes it possible to determine whether to automatically stop the engine 5 upon the occupant's request. Hence, by allowing for the selection as to whether to automatically stop the engine as necessary, it is possible to suppress vehicle theft, carbon monoxide poisoning of the occupant, etc., while ensuring convenience and comfort of the occupant.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The engine control ECU 11 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the engine control ECU 11. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the engine control ECU 11 illustrated in FIG. 1.

The invention claimed is:

1. An engine controller configured to control an engine of a vehicle, the engine controller comprising one or more processors configured to:

when a predetermined condition is established, perform an automatic stop mode for stopping operation of the engine;

in the automatic stop mode, measure a time duration during which no driving operations with respect to the vehicle are detected while the engine is in operation;

when the time duration becomes longer than a first time, give an occupant of the vehicle a notification about an automatic stop of the engine after elapse of a second time;

until the elapse of the second time since the notification, cause a display provided in the vehicle to display an input screen that prompts the occupant to select one of (i) a first option for inputting an instruction to continue the operation of the engine and (ii) a second option for inputting an instruction to stop the operation of the engine;

until the elapse of the second time since the notification, accept, through the input screen, a selection of the first option as the instruction to continue the operation of the engine or a selection of the second option as the instruction to stop the operation of the engine;

in response to accepting the instruction to continue the operation of the engine, continue the operation of the engine; and in response to accepting the instruction to stop the operation of the engine, or in response to determining that neither the first option nor the second option has been selected until the elapse of the second time since the notification, stop the operation of the engine after the elapse of the second time since the notification.

2. The engine controller according to claim 1, wherein the one or more processors are configured to, in response to accepting the instruction to continue the operation of the engine, reset the measurement of the time duration and restart the measurement of the time duration.

3. The engine controller according to claim 2, wherein the one or more processors are configured to, in response to accepting the selection of the first selectable option, give the occupant of the vehicle a notification about the reset of the measurement of the time duration.

4. The engine controller according to claim 1, wherein the one or more processors are configured to, when refraining from performing the automatic stop mode, refrain from measuring the time duration during which no driving operations with respect to the vehicle are detected while the engine is in operation.

5. The engine controller according to claim 1, wherein the one or more processors are configured to, in response to accepting the selection of the first selectable option, stop the measurement of the time duration, continue the operation of the engine, and turn OFF the automatic stop mode.

6. The engine controller according to claim 1, wherein the one or more processors are configured to continue the operation of the engine until a power supply of the vehicle is switched OFF or the second selectable option is accepted.

7. The engine controller according to claim 1, wherein the one or more processors are configured to, when the vehicle is fed with electric power from an external emergency power supply, determine that electric power is supplied by the external emergency power supply and turn OFF the automatic stop mode.

8. The engine controller according to claim 1, wherein the predetermined condition includes:

a shift lever of the vehicle being in a P range;

a vehicle speed of the vehicle being less than a certain speed; and no brake operations and no clutch operations being made.

* * * * *